US010875598B1

(12) United States Patent
Reineck

(10) Patent No.: US 10,875,598 B1
(45) Date of Patent: Dec. 29, 2020

(54) RAKE DEVICE FOR A THREE WHEEL MOTORCYCLE

(71) Applicant: Motor Trike, Inc., Troup, TX (US)

(72) Inventor: Ryan Reineck, Troup, TX (US)

(73) Assignee: Motor Trike, Inc., Troup, TX (US)

( * ) Notice: Subject to any disclaimer, the term of this patent is extended or adjusted under 35 U.S.C. 154(b) by 256 days.

(21) Appl. No.: 16/128,211

(22) Filed: Sep. 11, 2018

Related U.S. Application Data

(60) Provisional application No. 62/717,262, filed on Aug. 10, 2018.

(51) Int. Cl.
| | |
|---|---|
| *B62K 21/02* | (2006.01) |
| *B62K 21/12* | (2006.01) |
| *B62K 21/18* | (2006.01) |
| *B62K 21/22* | (2006.01) |
| *B62K 21/06* | (2006.01) |
| *B62K 25/24* | (2006.01) |

(52) U.S. Cl.
CPC .............. *B62K 21/22* (2013.01); *B62K 21/02* (2013.01); *B62K 21/06* (2013.01); *B62K 25/24* (2013.01)

(58) Field of Classification Search
CPC ........ B62K 21/02; B62K 21/06; B62K 21/12; B62K 21/16; B62K 21/18; B62K 21/22; B62K 21/24
See application file for complete search history.

(56) References Cited

U.S. PATENT DOCUMENTS

| | | | | |
|---|---|---|---|---|
| 5,441,291 A | * | 8/1995 | Girvin, III | B62K 25/24 267/293 |
| 10,131,399 B2 | * | 11/2018 | Kuwabara | B62K 21/20 |
| 2015/0274245 A1 | * | 10/2015 | Kuwabara | B62K 21/18 280/276 |
| 2016/0280314 A1 | * | 9/2016 | Taguma | B62K 25/24 |
| 2017/0088229 A1 | * | 3/2017 | Mori | B62K 21/18 |
| 2018/0178876 A1 | * | 6/2018 | Araki | B62K 25/04 |
| 2019/0127012 A1 | * | 5/2019 | Lindholm | B62K 25/02 |
| 2019/0283836 A1 | * | 9/2019 | Boulton | B62M 7/02 |
| 2020/0102047 A1 | * | 4/2020 | Tsutsui | B62K 25/16 |

* cited by examiner

*Primary Examiner* — Tony H Winner

(74) *Attorney, Agent, or Firm* — Jones Walker LLP

(57) ABSTRACT

A method of modifying the rake angle on a motorcycle having a double wishbone front suspension. The motorcycle has a tubular steering housing connected to a non-telescoping fork assembly by a straight body steering stem. The method includes the step of replacing the straight body steering stem with a canted body steering stem. The canted body steering stem includes (i) a primary section having a steering axis corresponding to a steering axis of the motorcycle; and (ii) a secondary section having a cant axis which varies from the steering axis by between 1° and 16°.

11 Claims, 4 Drawing Sheets

RAKE DEVICE FOR A THREE WHEEL MOTORCYCLE

CROSS-REFERENCE TO RELATED APPLICATION

This application claims the benefit under 35 USC § 119 to U.S. Provisional Application Ser. No. 62/717,262 filed Aug. 10, 2018 and which is incorporated by reference herein in its entirety.

BACKGROUND OF INVENTION

The present invention relates to steering mechanisms for motorcycles and more specifically, modifying the rake angle of the steering mechanism.

Traditional motorcycle steering/front suspension designs often have triple trees and telescoping forks with spring and shock absorbing functions being internal to the forks. The steering system includes a steering axis and a steering axis angle. The steering axis is the axis about which the steering mechanism (fork, handlebars, front wheel, etc.) pivots, and usually matches the angle of the head tube. The steering axis angle is the angle that the steering axis makes with the horizontal or vertical, depending on convention. In motorcycles, the steering axis angle is typically called the "rake angle" (or just "rake") and is measured from the vertical, e.g., a 0° rake would be vertical. The "trail" is the horizontal distance from where the front wheel touches the ground to where the steering axis intersects the ground. With a traditional triple tree front suspension, the rake is normally modified by changing the angle of the down tubes relative to the steering stem. This moves the tire contact patch closer to where the steering axis intersects the ground and reduces the trail, thereby reducing the steering effort.

However, certain motorcycle designs such as the 2018 Honda® Goldwing® have a double wishbone front suspension similar to a car. In this design, there are no telescoping forks to house the spring/shock assembly. Instead, the forks are rigid and there is a separate coil over shock that bolts between a lower control arm and the motorcycle frame. One rake modification ("rake kit") for this type of suspension is to change the length of the upper and lower control arms, but this moves the steering axis along with the front wheel (similar to a "chopper" style motorcycle) and it does not reduce trail with particular effectiveness. It also changes ride quality by changing the leverage the suspension has on the shock. A better method for modifying the rake on double wishbone type steering/suspension systems would be a desirable advancement in the industry.

SUMMARY OF SELECTED EMBODIMENTS OF INVENTION

One embodiment of the invention is a motorcycle steering system configured for connection to a motorcycle frame. The steering system includes a tubular steering housing attachable to the motorcycle frame by at least one control arm. A spring assembly is positioned either (i) between the control arm and the motorcycle frame, or (ii) between the steering housing and the motorcycle frame. A non-telescoping fork assembly is positioned below the steering housing, while a steering stem is positioned at least partially within the steering housing. The steering stem includes a secondary section attaching to the fork assembly and a primary section having a steering axis. The secondary section has a cant axis varying from the steering axis by between at least 1° and about 16°.

Another embodiment of the invention is a method of modifying the rake angle on a motorcycle having a double wishbone front suspension. The motorcycle will have a tubular steering housing connected to a non-telescoping fork assembly by a straight body steering stem. The method will include the step of replacing the straight body steering stem with a canted body steering stem. The canted body steering stem will include (i) a primary section having a steering axis corresponding to a steering axis of the motorcycle; and (ii) a secondary section having a cant axis which varies from the steering axis by between 1° and 16°.

DETAILED DESCRIPTION OF SELECTED EMBODIMENTS OF INVENTION

Figure 1:
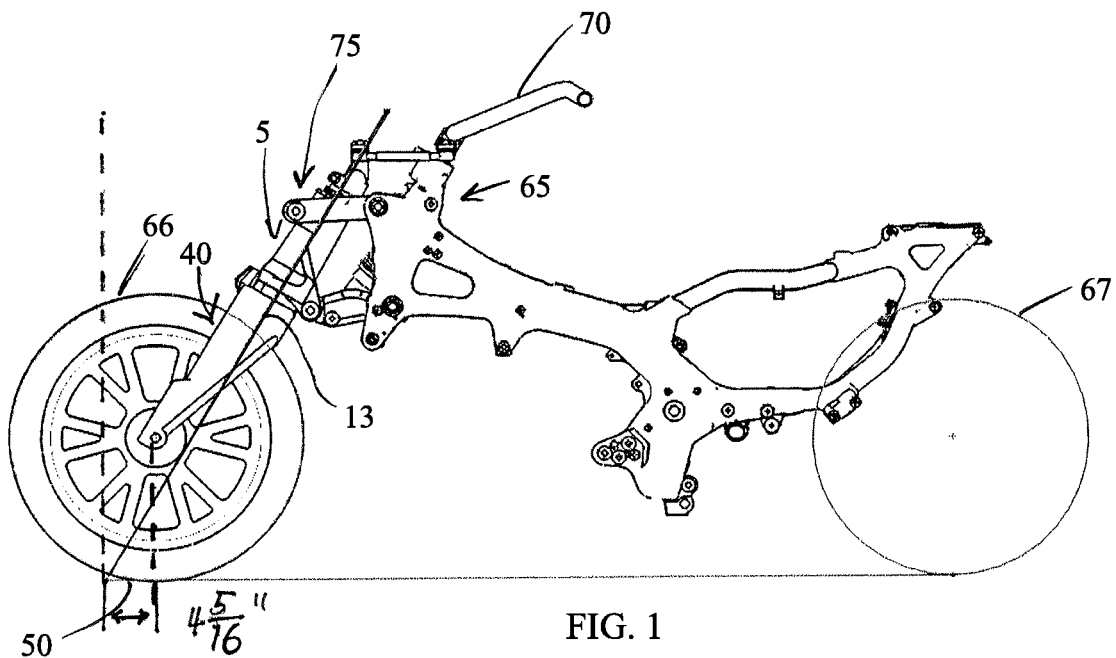
FIG. 1 is a side view of the general frame of a motorcycle having a double wishbone front suspension.

FIG. 1 illustrates a general frame of a motorcycle having a double wishbone front suspension, with rear wheel 67, front wheel 66, and the front portion of the motorcycle frame 65. Fork assembly 40 engages steering housing 5 which is connected to frame 65 by front suspension assembly 75. The steering axis 13 extends through steering housing 5 to intersect the ground. The trail 50 can be seen as the horizontal distance from where the front wheel touches the ground to where the steering axis intersects the ground. Although FIG. 1 suggests a two wheel motorcycle, the following disclosure applies equally to three wheel motorcycles with a rear axle driving two rear wheels (often referred to as a "trike"); see for example the three wheel motorcycle in U.S. Pat. No. 6,964,314, which is incorporated by reference herein in its entirety. The same front portion of the frame is used in both two wheel and three wheel motorcycles. Thus, the term "motorcycle" as used herein is intended to cover both two wheel and three wheel motorcycles.

Figure 2:
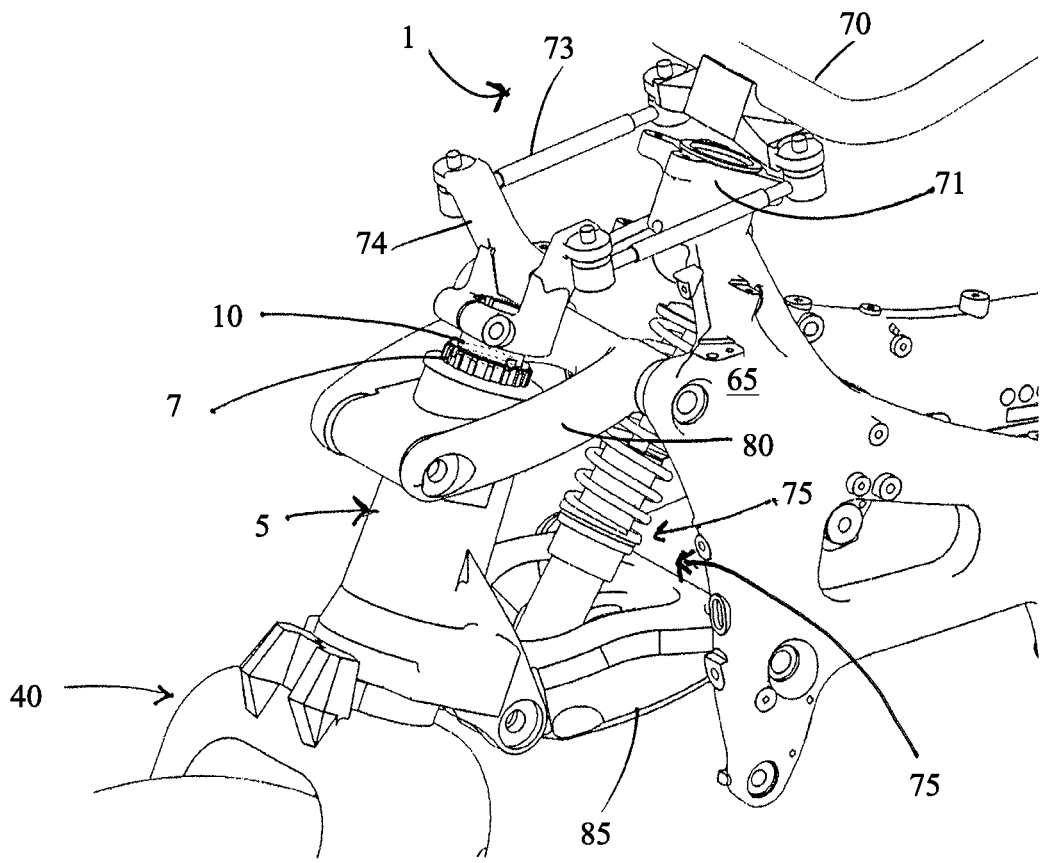
FIG. 2 is a perspective view of the front motorcycle frame and the double wishbone suspension.
Figure 3A:
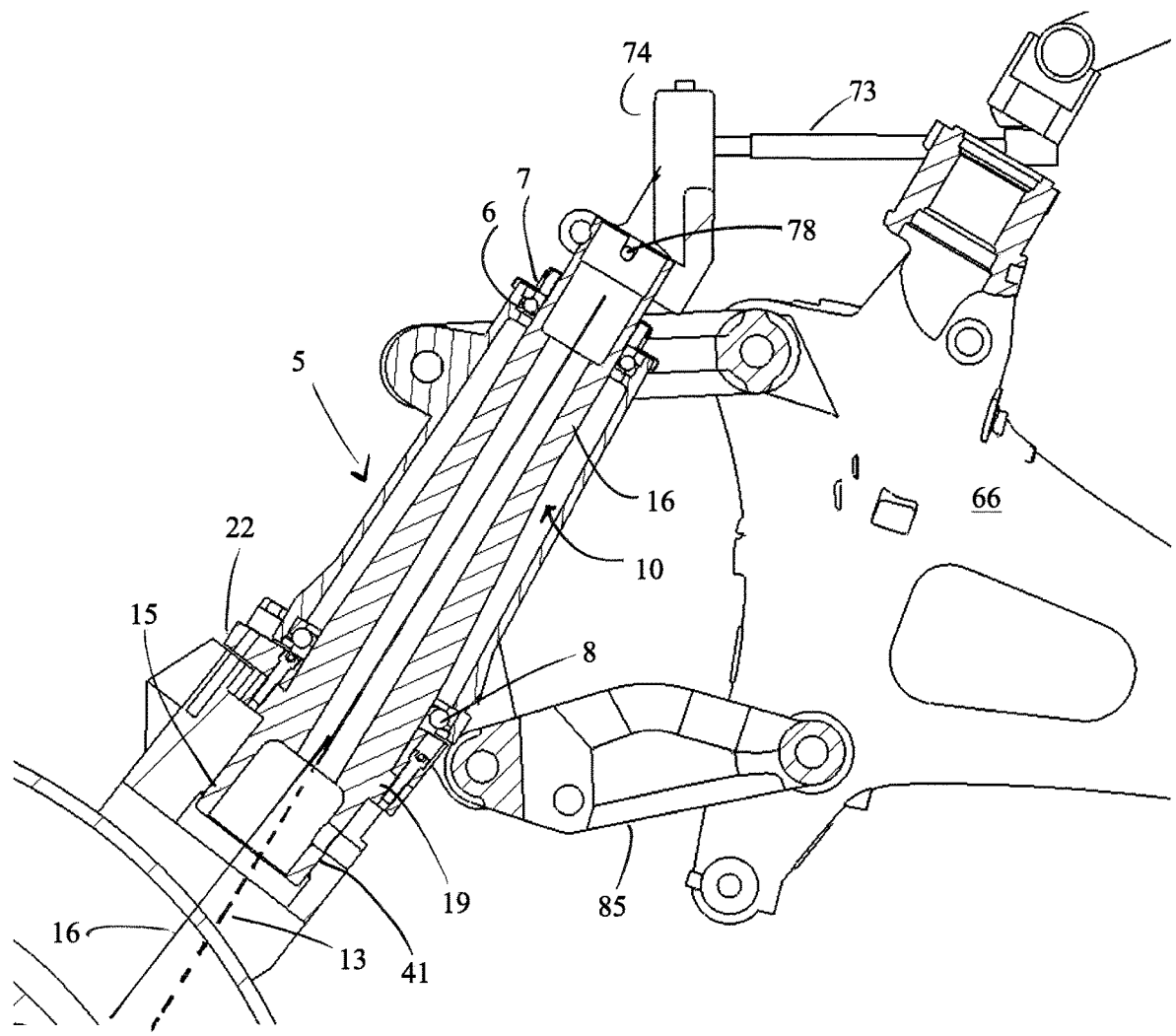
FIG. 3A is a sectional view of the front motorcycle frame and the double wishbone suspension.
Figure 3B:
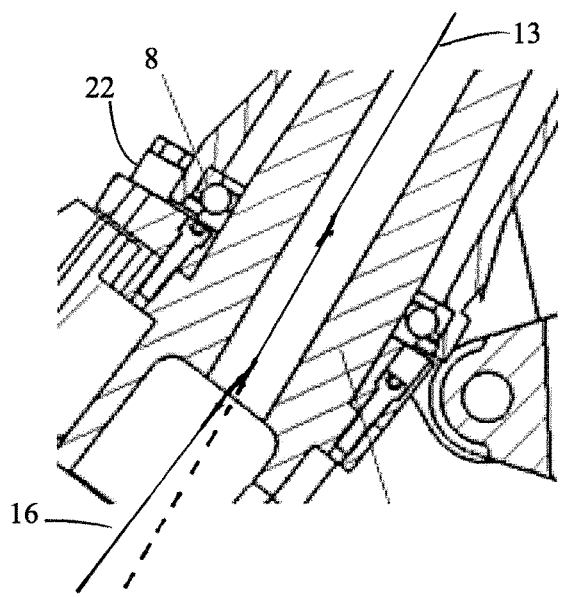
FIG. 3B is a detailed portion of the FIG. 3A view.

The overall steering system 1 of the motorcycle is best seen in FIGS. 2 and 3A. The handle bars 70 will pivotally engage handle bar column 71, which is part of front frame 65. The rotating motion of handling bars 70 is transmitted through steering tie rods 73, to the steering yoke 74, and ultimately to steering stem 10 (which is more clearly seen in FIG. 3A and is largely internal to steering housing 5). Nevertheless, an upper end of steering stem 10 extends above steering housing 5 to engage steering yoke 74 while a lower end extends below steering housing 5 to engage fork assembly 40. In other words, steering stem 10 extends at least partially from steering housing 5 to engage fork assembly 10 and steering yoke 74. With this linkage, the steering stem 10 transfers steering torque to fork assembly 40, which of course turns the front wheel 66 of the motorcycle. This embodiment of fork assembly 40 is a rigid, non-telescoping type of fork assembly.

Additionally, the suspension assembly 75 provides the shock absorbing function between wheel displacement transmitted through steering housing 5 and front motorcycle frame 65. Suspension assembly 75 includes the upper control arm 80 and the lower control arm 85 which forms a rotative connection between lower control arm 85 and frame 65. The spring/shock assembly 76 is pivotally connected at one end to stem housing 5 and at its opposite end to frame 65. In this manner, spring/shock assembly 76 acts to dampen relative rotation between stem housing 5 and frame 65 on the control arms 80 and 85. In the illustrated embodiment, spring/shock assembly 76 is a conventional spring over piston type of shock absorber. However, spring/shock assembly could also be only a spring, only a piston, or another type of shock absorber that provides a dampening or spring effect. The term "spring assembly" will be used to describe any of the foregoing or any future developed shock absorbing device that provides a spring-like dampening effect.

Figure 4A:
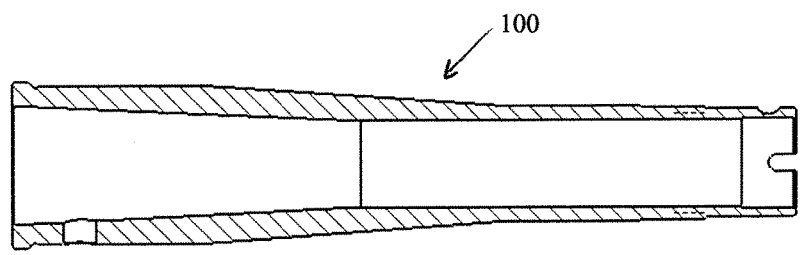
FIG. 4A is a cross-section of a prior art steering stem.

As best seen in FIG. 3A, the steering stem 10 extends through steering housing 5 and acts to transfer torque from steering yoke 74 to fork assembly 40. This embodiment of steering stem 10 is shown in isolation in FIG. 4B. For comparison, a prior art steering stem 100 is shown in FIG. 4A. In the FIG. 4B embodiment, steering stem 10 is formed of an elongated tubular stem body 11, although other embodiments of stem body 11 could be a solid section of material, typically either aluminum or steel. Stem body 11 has a primary section 12 which is typically at least 75% of the length of the entire stem body. The primary section 12 of stem body 11 is concentric around the axis 13 which also forms the steering axis of the motorcycle. In the FIG. 3A embodiment, the primary section 12 of the steering stem 10 is also oriented as the "upper section" of the steering stem. Thus, the pin slot 25 is engaged by a steering yoke pin 78 and the threaded section 26 is engaged by lock nut 7, as both seen in FIG. 3A. Stem body 11 also includes a secondary section 15 (a "lower section" in the FIG. 3A orientation) which is concentric around a secondary axis 16. Because secondary axis 16 is "canted" at an angle relative to steering axis 13, secondary axis 16 will also be referred to as "cant axis" 16. In many embodiments, the angle "alpha" between steering axis 13 and cant axis 16 is between 1° and about 16° (or any sub-range in between). A more preferred range of alpha is between about 4° and about 10°, with one specific example of alpha being about 7°. The angle alpha may also sometimes be referred to as the "cant angle." Likewise, the steering stem 10 may sometimes be referred to as a "canted body" steering stem. Secondary section 15 of stem body 11 also includes a collar section 19 with bolt apertures 20 and the pin aperture 24. Overall, steering stem 10 will be, as measured along the length of the two axes, between about 5% and about 25% (or any sub-range in between) longer than the prior art "straight" steering stem 100 such as seen in FIG. 4A for a given model of motorcycle and which may be presumed to be the original equipment steering stem for the motorcycle as sold by the manufacturer. In many embodiments, steering stem will range in length between about 6" and about 16" inches (or any sub-range in between), with more preferred embodiments being 10" to 14". In many embodiments, the canted body steering stem will have "exclusively" two sections with two different (nonparallel) axes, i.e., the canted body will not have a third section with a third axis.

Returning to FIG. 3A, it is seen how the secondary section 15 of stem body 11 will engage (generally with a friction fit) the stem aperture 41 formed in fork assembly 40 until collar 19 abuts the top of stem aperture 41. A pin (not shown) will extend through the wall of stem aperture 41 and engage the pin aperture in stem secondary section 15 to ensure fork assembly 40 and steering stem 10 are fixed against relative lateral (along axis 16) and rotative movement. A fork stop extension 22 will be bolted to collar 19 with bolts threaded into bolt apertures 20. Fork stop extension 22 serves the same function as prior art fork stops, i.e., limiting how far the fork assembly can rotate right or left. However, the prior art fork stops may be prevented from engaging their intended stop surfaces due to the additional length of steering stem 10 as compared with the prior art steering stem 100. FIG. 3A further illustrates the upper bearing assembly 6 and the lower bearing assembly 8 positioned between steering housing 5 and steering stem 10. These bearing assemblies allow free rotation of steering stem 10 inside of steering housing, thus transferring torque from the handle bars 70 to the fork assembly 40 in the lowest friction manner practical. In the illustrated embodiment, the bearings engage the primary section of the steering stem, i.e., the steering stem transitions to the cant axis below the lower bearing surface.

Figure 5:
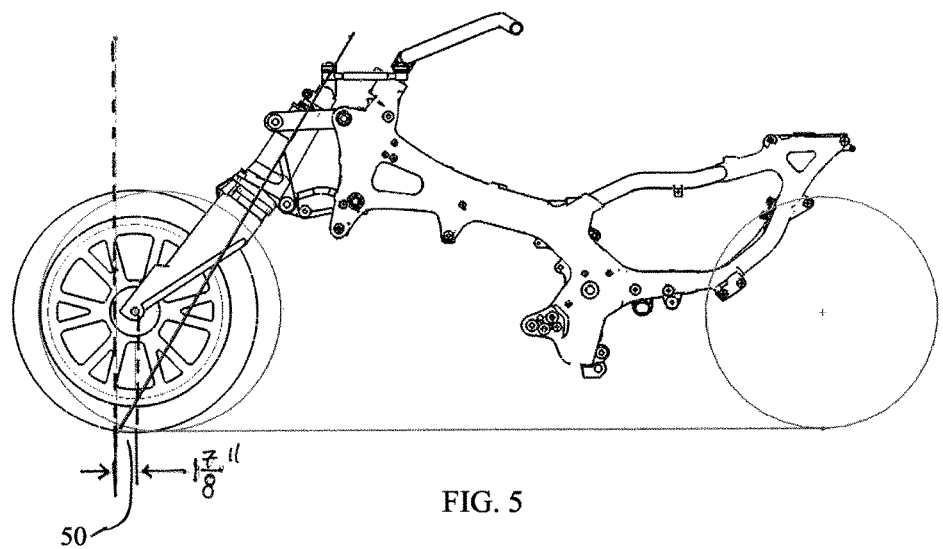
FIG. 5 is a side view illustrating a change in trail.

As described above, the "trail" is the horizontal distance from where the front wheel touches the ground to where the steering axis intersects the ground. For example, if it is assumed that FIG. 1 illustrates a motorcycle with the straight steering stem 100 of FIG. 4A, FIG. 1 shows the steering axis 13 intersecting the ground and the point where the front wheel touches the ground (directly below the front wheel axial), producing an indicated trail 50 of 4⁵⁄₁₆ inches. On the other hand, if FIG. 5 illustrates a motorcycle with the canted steering stem 10 seen in FIG. 4B, then the front wheel axial is moved forward (as is the point where the front wheel rests on the ground). Because the point of wheel contact with the ground is now closer to the point where the steering axis 13 intersections the ground, the trail 50 has been reduced to a smaller distance of 1⅞ inches. Naturally these specific trail distances are merely examples and trail length or distance may vary considerably among different motorcycle manufacturers and models. In many embodiments, the trail distance will be between 1" and about 3.5". It will be apparent how varying the cant angle and overall length of the steering stem 10 provides a simple, reliable, and economical manner of adjusting the trail length.

Figure 4B:
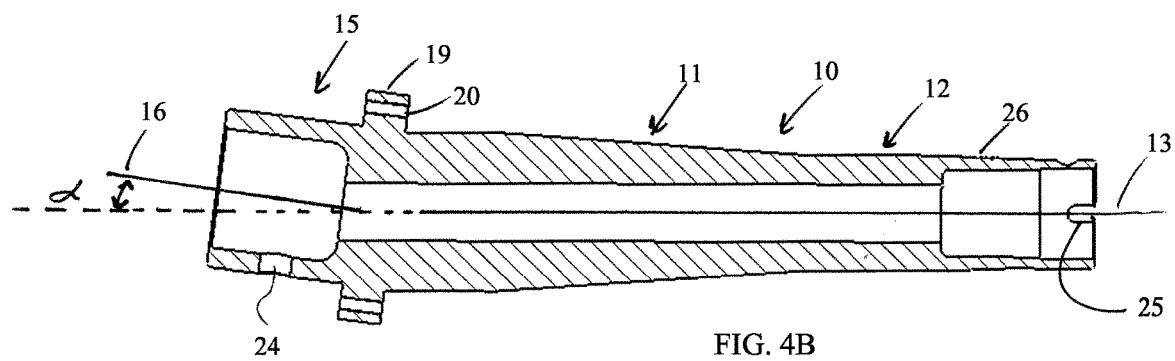
FIG. 4B is a cross-section of one embodiment of a steering stem of the present invention.
Figure 6:
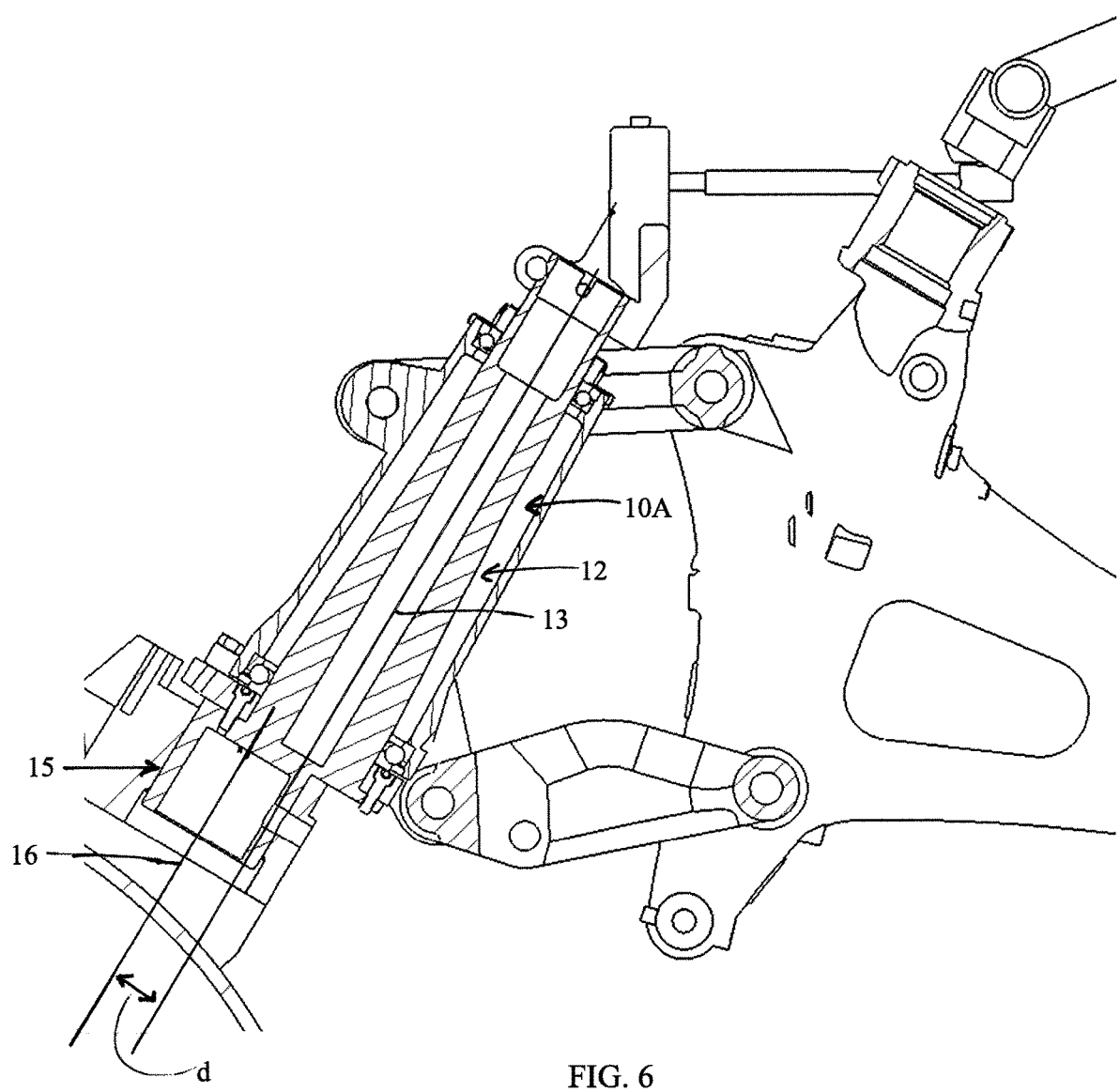
FIG. 6 is a sectional view of a second embodiment of the steering stem of the present invention.

FIG. 6 shows an alternate embodiment of the steering stem illustrated as steering stem 10A. This embodiment of the steering stem is substantially identical to the FIG. 4B embodiment, except the secondary section 15 does not have a canted axis relative to the steering axis. In FIG. 6, the secondary section 15 of steering stem 10A is "offset" from and oriented parallel to primary section 12. In other words, the secondary axis 16 is offset from and parallel to steering axis 13. In the illustrated embodiment, secondary axis 16 is offset from steering axis 13 by a distance "d" of between about 0.25" and about 7.0" (or any sub-range in between), and more preferably, between about 0.5" and about 5.0". Although FIGS. 4B and 6 illustrate two embodiments of a modified steering stem having two axes, it is understand that the present invention could cover other steering stems having two sections, with one section being concentric around a steering axis and the other section being concentric around a second, different axis.

A further embodiment of the present invention includes a method of modifying the rake angle on a motorcycle having a double wishbone front suspension. The motorcycle will have a tubular steering housing connected to a non-telescoping fork assembly by a straight body steering stem. The method will include the step of replacing the straight body steering stem with a canted body steering stem. The canted body steering stem will include (i) a primary section having a steering axis corresponding to a steering axis of the motorcycle; and (ii) a secondary section having a cant axis which varies from the steering axis by between 1° and 16°, and more preferably 3° and 10°. Similarly, the canted body steering stem will typically be about 5% and about 25% longer than the prior art straight body steering stem.

The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

The invention claimed is:

1. A method of modifying the rake angle on a motorcycle having a double wishbone front suspension, including a tubular steering housing connected to a non-telescoping fork assembly by a straight body steering stem, the method comprising the step of: (a) replacing the straight body steering stem with a twin axis steering stem, wherein the twin axis steering stem includes:
   (i) a primary section having a steering axis corresponding to a steering axis of the motorcycle; and
   (ii) a secondary section having a secondary axis, wherein the secondary axis is offset from and parallel with the steering axis.

2. The method according to claim 1, wherein the secondary axis is parallel to and offset from the steering axis by between 0.25" and 7.0".

3. The method according to claim 2, wherein the secondary axis is parallel to and offset from the steering axis by between 0.5" and 5.0".

4. The method according to claim 1, wherein at least two-thirds of a length of the steering stem is concentric around the steering axis.

5. The method according to claim 1, wherein the secondary section is less than 25% of an overall length of the primary section.

6. The method according to claim 1, wherein the steering stem reduces a trail of the motorcycle to less than 3 inches.

7. The method according to claim 1, wherein the motorcycle is a three-wheel motorcycle having two rear wheels.

8. The method according to claim 1, wherein a collar section extends from the stem body at a transition point of the primary section to the secondary section.

9. The method according to claim 1, further comprising an upper and lower control arm connecting the steering housing to the motorcycle frame.

10. The method according to claim 1, wherein a steering yoke connects to an uppermost portion of the steering stem.

11. The method according to claim 1, wherein at least part of the secondary section of the steering stem inserts into the fork assembly.

\* \* \* \* \*